United States Patent
Wadell

(10) Patent No.: US 10,501,298 B2
(45) Date of Patent: Dec. 10, 2019

(54) LINEAR ACTUATOR SYSTEM FOR MOVING TINES OF A WORK VEHICLE

(71) Applicant: Tyri International, Inc., Stevens Point, WI (US)

(72) Inventor: Christian Wadell, Hisings Backa (SE)

(73) Assignee: Tyri International, Inc., Stevens Point, WI (US)

( * ) Notice: Subject to any disclaimer, the term of this patent is extended or adjusted under 35 U.S.C. 154(b) by 0 days.

(21) Appl. No.: 15/944,358

(22) Filed: Apr. 3, 2018

(65) Prior Publication Data

US 2018/0282141 A1  Oct. 4, 2018

Related U.S. Application Data

(60) Provisional application No. 62/481,264, filed on Apr. 4, 2017.

(51) Int. Cl.
| | |
|---|---|
| *H02J 50/10* | (2016.01) |
| *B66F 9/24* | (2006.01) |
| *H02J 7/00* | (2006.01) |
| *B66F 9/075* | (2006.01) |
| *B66F 9/14* | (2006.01) |
| *H02J 7/02* | (2016.01) |

(52) U.S. Cl.
CPC ........... *B66F 9/24* (2013.01); *B66F 9/07504* (2013.01); *B66F 9/14* (2013.01); *H02J 7/0013* (2013.01); *H02J 7/025* (2013.01); *H02J 50/10* (2016.02)

(58) Field of Classification Search
CPC .......... B60L 1/00; B60L 1/14; B60L 2200/42; B60R 16/033; B66F 9/0755; H02J 5/005; H04B 5/0037; H04B 5/0093; Y02T 90/16
See application file for complete search history.

(56) References Cited

U.S. PATENT DOCUMENTS 3,543,959 A * 12/1970 Stammen .................. B66F 9/12
414/667
4,252,217 A   2/1981 Benjamin
(Continued)

FOREIGN PATENT DOCUMENTS

DE  10 2012 021043   4/2014
EP         2628703    8/2013
(Continued)

OTHER PUBLICATIONS

PCT/US2018/026008, International Search Report and Written Opinion, dated Jul. 13, 2018, 13 pages.

*Primary Examiner* — Jared Fureman
*Assistant Examiner* — Emmanuel Dominique
(74) *Attorney, Agent, or Firm* — Boyle Fredrickson, S.C.

(57) ABSTRACT

Linear electric actuators are used for moving forks or tines of a forklift. The tines can be positioned to move horizontally, inward or outward, along a guide, according to actuation of the linear electric actuators. The loading area comprising the tines can be positioned to move vertically, upward or downward, along masts or uprights of the forklift. The actuators for the tines can be operated by a battery. When the tines are in the down position, the battery can be charged by a charging system that includes a part fixed to the forklift. However, when the forks are raised from the down position, vertically along the masts or uprights, the charging ceases, and the actuators can continue to operate from the battery.

18 Claims, 11 Drawing Sheets

(56) References Cited

U.S. PATENT DOCUMENTS

| | | | |
|---|---|---|---|
| 5,139,385 A | 8/1992 | Chase et al. | |
| 5,374,156 A | 12/1994 | Simpson et al. | |
| 6,430,761 B1 | 8/2002 | Brandroff et al. | |
| 7,544,037 B2 | 6/2009 | Haverfield et al. | |
| 8,317,243 B2 | 11/2012 | Emond et al. | |
| 9,394,149 B2 | 7/2016 | Karlsson et al. | |
| 2006/0255943 A1* | 11/2006 | Hougen | G06K 7/10346 340/572.1 |
| 2010/0327544 A1 | 12/2010 | Pebworth et al. | |
| 2011/0259673 A1* | 10/2011 | Hayase | B66F 3/08 187/233 |
| 2011/0297486 A1* | 12/2011 | Kaneko | B66F 9/20 187/233 |
| 2012/0145485 A1* | 6/2012 | McCabe | H02J 7/025 187/226 |
| 2014/0183966 A1 | 7/2014 | Suzuki et al. | |
| 2016/0233687 A1* | 8/2016 | McKernan | H02J 5/005 |

FOREIGN PATENT DOCUMENTS

| | | |
|---|---|---|
| EP | 1695861 | 6/2014 |
| EP | 1474353 | 7/2016 |
| WO | 2009137484 | 11/2009 |
| WO | 2016/137540 | 9/2016 |

\* cited by examiner

LINEAR ACTUATOR SYSTEM FOR MOVING TINES OF A WORK VEHICLE

CROSS-REFERENCE TO RELATED APPLICATION(S)

This is a non-provisional application based upon U.S. provisional patent application Ser. No. 62/481,264, entitled "Inductively Charged Linear Actuator System For Moving Tines Of A Forklift," filed Apr. 4, 2017, which is incorporated herein by reference.

FIELD OF THE INVENTION

This invention relates to systems for operating a work vehicle, such as a forklift, and more particularly, to a system for moving tines on a work vehicle using linear electric actuators and selective charging of a power source for the linear actuators.

BACKGROUND OF THE INVENTION

Working vehicles, such as trucks, forklifts, cranes, backhoes, excavators, bulldozers, loaders and the like, oftentimes include mechanisms which may be movable with respect to one another to accomplish a function. For example, tow trucks may be fitted with beds which may be hydraulically inclined and moved to ground level to allow disabled vehicles to be loaded. As another example, forklifts will typically include forks which may be raised along masts or uprights for lifting and moving heavy objects on pallets. Integral in these vehicles is the ability to provide a mechanical movement to accomplish a function, such as lifting, digging, swinging, rotating, holding, and the like.

It is known to use hydraulic linear actuators to provide various movements on such vehicles. For example, some forklifts use a first set of hydraulic actuators for raising or lowering the forks along the masts, and a second set of hydraulic actuators for spreading the individual forks or tines, regardless of whether they have been raised or lowered. To accomplish this, an advance roll up system for hydraulic hoses is provided, so that hydraulic fluid can be provided to the second set of hydraulic actuators for spreading the forks when the first set of hydraulic actuators has raised the forks.

However, having an advance roll up of such hoses can increase costs in the system and limit visibility for the operator. In addition, having multiple hydraulic actuators and hoses also requires having multiple valves for controlling the hydraulic actuators. This can also increase costs in the system. It is therefore desirable to provide a system which can provide mechanical movements on vehicles to accomplish various functions without one or more of the aforementioned drawbacks.

SUMMARY OF THE INVENTION

Linear electric actuators are used for moving forks or tines of a forklift. The tines can be positioned to move horizontally, inward or outward, along a guide, according to actuation of the linear electric actuators. The loading area comprising the tines can be positioned to move vertically, upward or downward, along masts or uprights of the forklift. The actuators for the tines can be operated by a battery. When the tines are in the down position, the battery can be charged by a charging system that includes a part fixed to the forklift. However, when the forks are raised from the down position, vertically along the masts or uprights, the charging ceases, and the actuators can continue to operate from the battery. The battery may be charged either by inductive or contact charging. As a result, the tines can be moved inward or outward, whether raised upward or lowered downward, using the battery. Accordingly, one or more disadvantages of hydraulic actuators can be avoided, such as requiring an advanced rollup system for hoses, which can adversely impact visibility, and/or requiring hydraulic valves, which can increase system maintenance and costs.

Specifically, one aspect of the present invention can provide a system for use on a work vehicle, including: a component configured to lower in a first (downward) position and raise in a second (upward) position; a linear electric actuator configured to move a portion of the component when in the first position or the second position; and a power source for providing power to the linear electric actuator for moving the portion, in which the power source provides power while being charged in the first position and provides power without being charged in the second position.

Another aspect of the present invention can include a system for moving tines on a forklift including: a power sending system, which may include a contact or a primary coil; a power receiving system, which may include a contact or a secondary coil in which the power sending system is configured to provide power to the power receiving system, such as between the primary and secondary coils via electromagnetic induction, when the power sending system is proximal to the power receiving system in a first position; first and second linear electric actuators for moving first and second tines, respectively; a first battery system configured to provide power to the first linear electric actuator; and a second battery system configured to provide power to the second linear electric actuator. The power receiving system can be configured to charge the first and second battery systems when in the first position.

These and other aspects and objects of the present invention will be better appreciated and understood when considered in conjunction with the following description and the accompanying drawings. It should be understood, however, that the following description, while indicating a representative embodiment of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiment illustrated in the drawings accompanying and forming a part of this specification, wherein like reference numerals designate the same elements in the several views, and in which.

Figure 1:
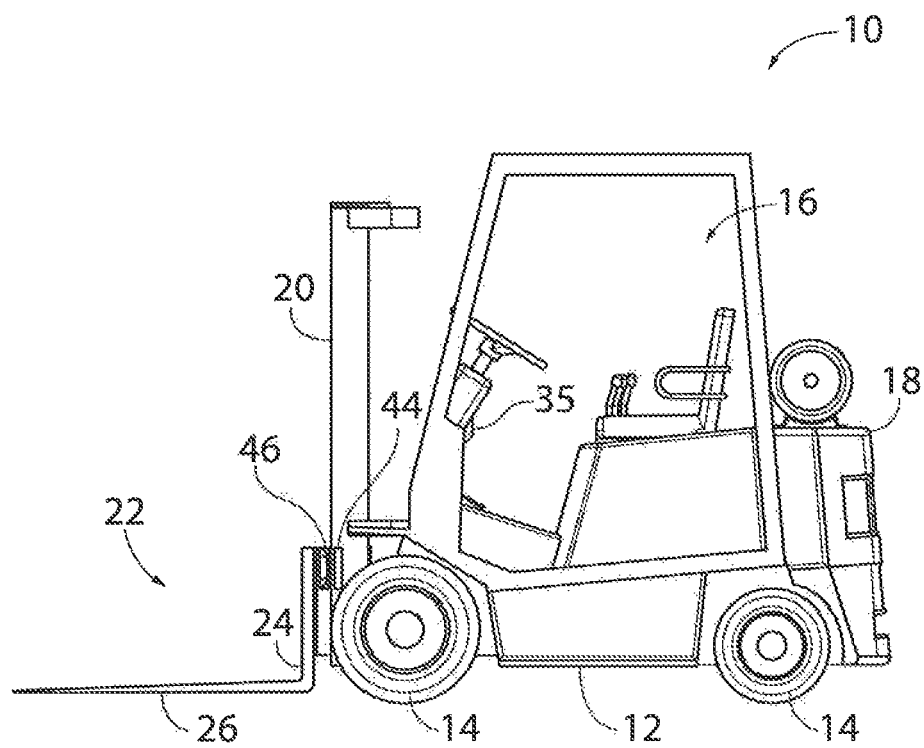
FIG. 1 is a side elevation view of a forklift incorporating moving tines using linear electric actuators in accordance with an aspect of the invention.

In describing the embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DETAILED DESCRIPTION

The present invention and the various features and advantageous details thereof are explained more fully with reference to the non-limiting embodiments described in detail in the following description.

Referring now to the drawings, and specifically to FIG. 1, aspects of the invention are shown for use with a vehicle which could be a forklift, fork truck or similar working vehicle. The vehicle is shown here as a forklift 10. The forklift 10 can include a frame 12 supported by wheels 14. The frame 12 can support an operator cab 16, an electric power source 18, which could be charged by a conventional engine, and uprights or masts 20. The masts 20, in turn, can support a component, such as a cargo or loading area 22, which can include a load apron 24 and forks or tines 26. The operator cab 16 can include a seat for an operator, along with instrumentation and controls for monitoring and controlling the forklift 10, including operation of the loading area 22.

Figure 2:
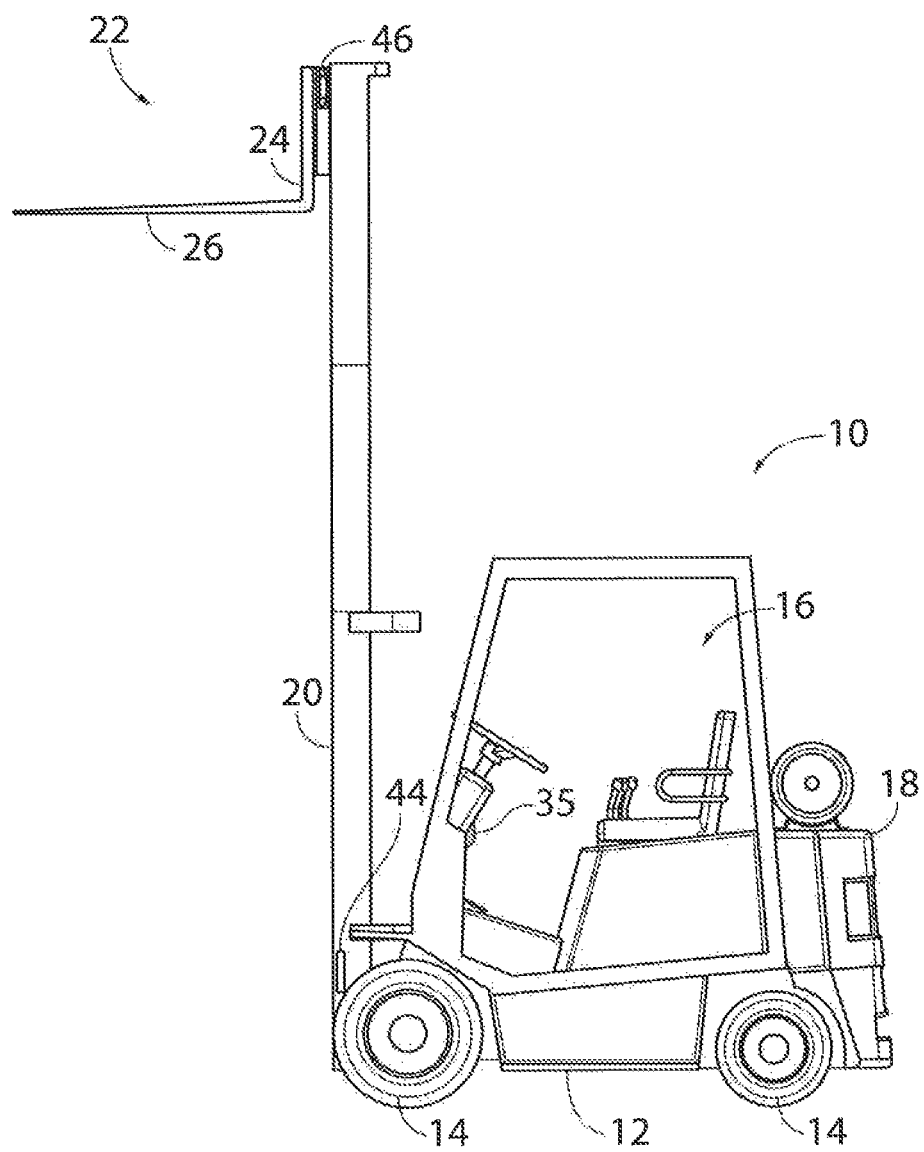
FIG. 2 is the forklift of FIG. 1 in which a loading area having the moving tines is in an upward/raised position.

With additional reference to FIG. 2, from the operator cab 16, an operator can drive the forklift 10 and control movement of the loading area 22 upward (shown in FIG. 2) or downward (shown in FIG. 1) with respect to the masts 20 via a set of electric or hydraulic mast actuators (not shown). With additional reference to FIG. 3, the operator can also control movement of the tines 26 of the loading area 22, such as first and second tines 26a and 26b, respectively, by moving such tines inward or outward with respect to one another via a set of tine actuators. Moreover, the first and second tines 26a and 26b, respectively, can be controlled to move individually with respect to one another, i.e., independently from one another and by varying amounts, or can be controlled to move in cooperation with one another. Accordingly, the forklift 10 is operable to move objects of varying sizes by grasping such objects with the tines 26 or supporting such objects on the tines 26, raising or lowering such objects along the masts 20, and moving such objects with the wheels 14.

Figure 3:
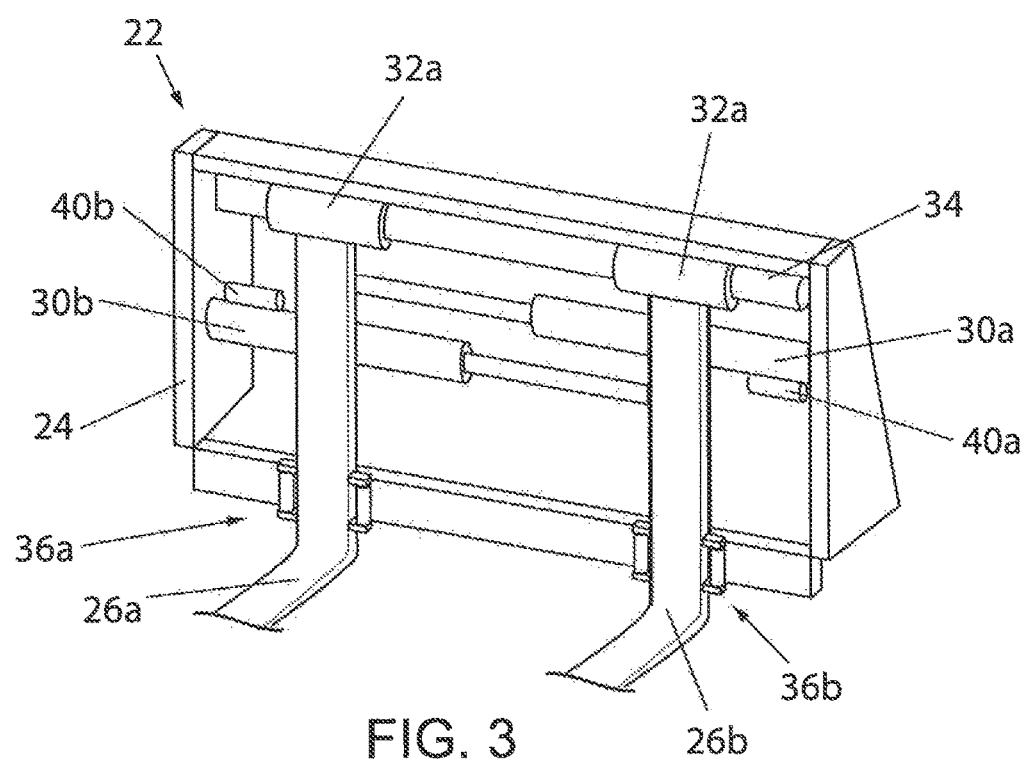
FIG. 3 is a front view of the loading area of FIG. 2.

As shown in FIG. 3, in accordance with an aspect of the invention, a set of tine actuators can include first and second linear electric actuators 30a and 30b, respectively. The first and second linear electric actuators 30a and 30b, respectively, can correspondingly control movement of a portion of the component, such as the first and second tines 26a and 26b, respectively, inward or outward with respect to one another, when in downward/lowered or upward/raised positions with respect to the masts 20. An isometric view of a representative linear electric actuator 30 is provided in FIG. 4.

In one aspect, the first and second tines 26a and 26b, respectively, can be configured to include first and second retainers 32a and 32b, respectively, at upper ends of the tines for coupling to a guide bar 34 of the load apron 24. The first and second tines 26a and 26b, respectively, can also be configured to include first and second rollers 36a and 36b, respectively, at lower ends of the tines for rolling along the load apron 24. The first linear electric actuator 30a can be mounted between the first tine 26a and the load apron 24, and the second linear electric actuator 30b can be mounted between the second tine 26b and the load apron 24. Accordingly, an operator in the operator cab 16 can control movement of the first tine 26a, with respect to the load apron 24, by actuating the first linear electric actuator 30a to retract, causing the first tine 26a to move inward, or extend, causing the first tine 26a to move outward. Similarly, the operator in the operator cab 16 can control movement of the second tine 26b, with respect to the load apron 24, by actuating the second linear electric actuator 30b to retract, causing the second tine 26b to move inward, or extend, causing the second tine 26b to move outward. Moreover, the operator in the operator cab 16 can control movement of the first and second tines 26a and 26b, respectively, individually, or in cooperation with one another, which can be beneficial to achieve variable symmetrical spacing between the first and second tines 26a and 26b, respectively.

Figure 4:
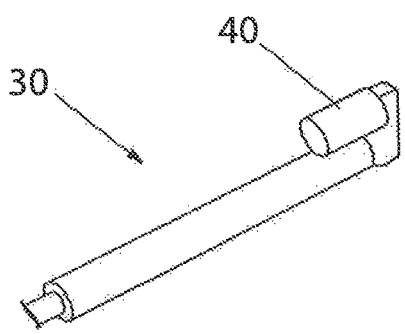
FIG. 4 is an isometric view of a linear electric actuator in accordance with an aspect of the invention.

As shown in FIGS. 3 and 4, in one aspect, a battery system 40 can be provided for each linear electric actuator 30, such as a first battery system 40a for the first linear electric actuator 30a, and a second battery system 40b for the second linear electric actuator 30b. Each battery system 40 can be positioned proximal to its corresponding linear electric actuator 30, such as by being directly mounted to the linear electric actuator 30 as shown in FIG. 4, or can be positioned further from the linear electric actuator 30, such as by being mounted on the load apron 24. Alternatively, it is understood that a single battery system may be provided for both electric actuators.

Figure 5:
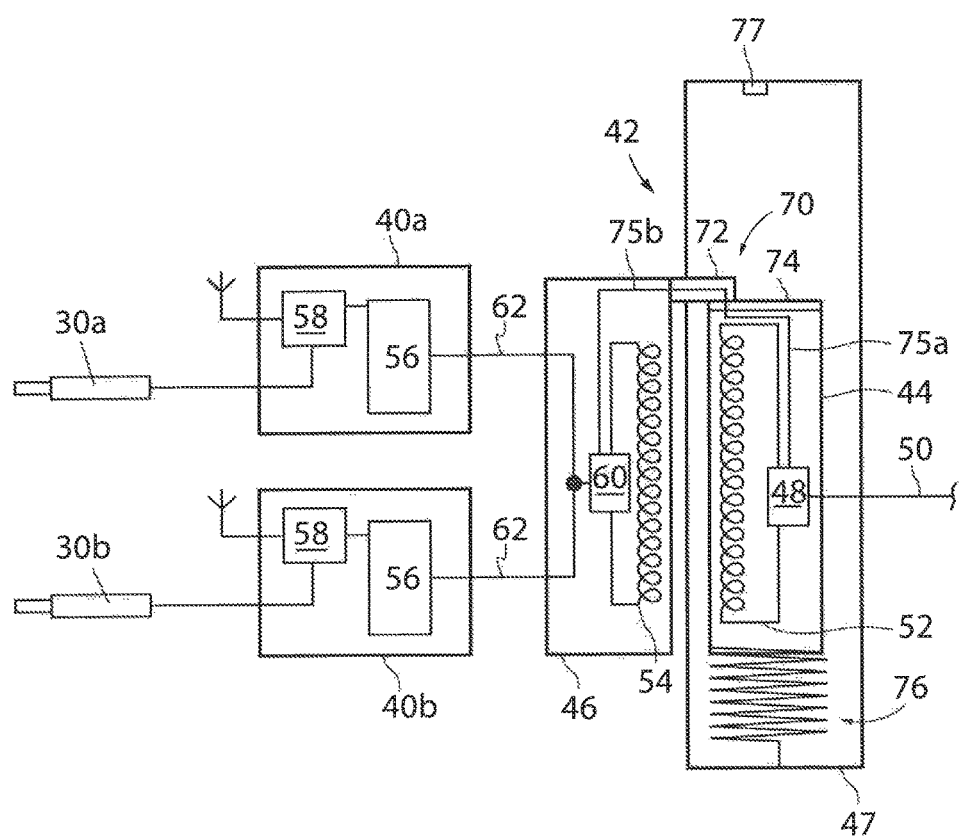
FIG. 5 is a schematic view of a charging system in a state corresponding to FIG. 1 in which the loading area is in a first or downward/lowered position and the charging system is transferring charge.

With additional reference to FIG. 5, each battery system 40 can include a power source, such as a power storage 56, which can comprise one or more batteries, capacitors and/or other electrical or chemical charge elements for receiving electrical charge, storing electrical power and providing power to the linear electric actuator 30. The power source can provide power to the linear electric actuator 30 while being charged when in a downward/lowered position with respect to the masts 20. The power source can also provide power to the linear electric actuator 30 without being charged when in an upward/raised position with respect to the masts 20. Each battery system 40 can also include a control system 58 for receiving wired or wireless commands from the operator cab 16, such as by a wired or wireless communication device 35. Accordingly, the control system 58 can be controlled by the operator in the operator cab 16 to allow the power storage 56 to provide a polarity, magnitude and duration of power to actuate its corresponding linear electric actuator 30 to retract or extend by a desired amount, with each battery system 40 moving with its corresponding linear electric actuator 30 as the loading area 22 is controlled to move up or down.

In accordance with an aspect of the invention, each battery system 40 can be charged via a charging system 42. The charging system 42 can include a power sending system 44 and a power receiving system 46 which can operate to charge each battery system 40 by wireless induction charging and/or direct (wired) contact charging.

As shown in FIG. 1, the power sending system 44 can be attached, for example, to the frame 12 to be proximal to the power receiving system 46 when the loading area 22 is in the downward/lowered position, or "first position." The power sending system 44 can receive power, such as from the power source 18, and can provide power to the power receiving system 46, when proximal to one another. Such power can be transferred wirelessly (inductively) via an electromagnetic field, or by direct power contact, when the loading area 22 is in the downward/lowered position.

Referring again to FIG. 5, in the first position, the power sending system 44, proximal to the power receiving system 46, can transfer charge inductively and/or by direct contact with the power receiving system 46. The power sending system 44 can include power sending circuitry 48 configured to receive power from the power source 18 via a power signal 50. For wirelessly (inductively) transferring charge, the power sending circuitry 48 can, in turn, generate an electrical current in a primary coil 52 to produce an electromagnetic field and transmit power. The electromagnetic field, in turn, can induce an electrical current in a secondary coil 54 of the power receiving system 46. The distance between the power sending system 44 and the power receiving system 46 in the presence of the electromagnetic field can be small, such as approximately 10 mm, which can also help to prevent dirt buildup. Power receiving circuitry 60 of the power receiving system 46, in turn, can receive the induced electrical current from the secondary coil 54 and send charge to the power storage 56 of each battery system 40 via a power signal 62. For example, the power receiving circuitry 60 can provide the power signal 62 to charge the power storage 56 of the first battery system 40a (for powering the first linear electric actuator 30a) and to charge the power storage 56 of the second battery system 40b (for powering the second linear electric actuator 30b). The power storage 56 of each battery system 40, in turn, can provide power to the control system 58, and the control system 58 can determine the polarity, magnitude and duration of power to provide to the corresponding linear electric actuator 30.

Figure 7:
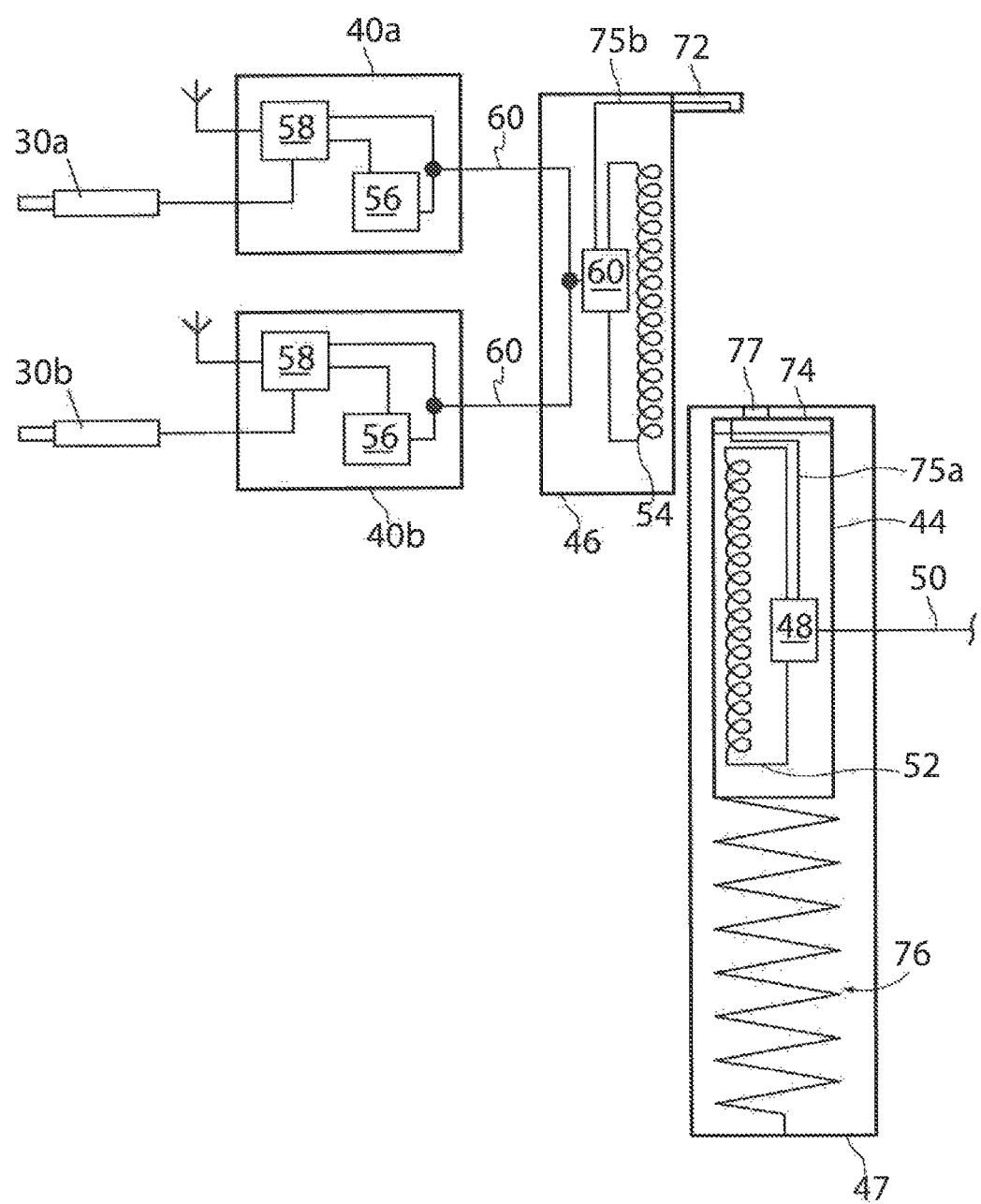
FIG. 7 is a schematic view of the charging system corresponding to FIG. 2 in which the loading area is in a second or upward/raised position and the charging system is no longer transferring charge.

As a result of the charging in the first position, the first and second battery systems 40a and 40b, respectively, can have sufficient charge to correspondingly actuate the first and second linear electric actuators 30a and 30b, respectively, even when the loading area 22 is in an upward/raised position, or "second position," as shown in FIGS. 2 and 7, and no longer charging.

The power sending system 44 and/or the power receiving system 46 can be in fixed positions. However, with additional reference to FIG. 6, the power sending system 44 and/or the power receiving system 46 can be configured to move a relatively small distance to maintain proximity for power transfer. In addition, if either the power sending system 44 or the power receiving system 46 is configured to move, a lock 70 can be provided between the power receiving system 46 and the power sending system 44. The lock 70 can cause the power receiving system 46 and the power sending system 44 to be movable together over a limited range in the first position when the lock is enabled. For example, as the load apron 24 moves with the power receiving system 46 upward, the power receiving system 46 can lock to the power sending system 44 to correspondingly move the power sending system 44 a small distance in the same direction.

The lock 70 can be magnetically and/or mechanically operated. The lock 70 can include a first portion 72 connected to the power receiving system 46 and a second portion 74 connected to the power sending system 44. The first and second portions 72 and 74, respectively, could be opposite poles of a magnet, for example. Such a magnet could be a permanent magnet, such as one made from an alloy of neodymium, or could be an electromagnetically produced magnetism, or otherwise. Alternatively, the first and second portions 72 and 74, respectively, can be opposite portions of a mechanical lock, such as a hook and loop, a detent and pin, or otherwise. The lock 70 can cause the power receiving system 46 and the power sending system 44 to be movable together, such as over a limited range of about ±100 mm, in order to maximize charging while in the first position.

The lock 70 can also provide the direct contacting electrical power connection between the power sending system 44 and the power receiving system 46. When the first portion 72 is in contact with the second portion 74 (in the first position), the power sending system 44 may transfer charge to the power receiving system 46 accordingly. For example, the power sending system 44 can charge the power receiving system 46 inductively and/or by direct (wired) contact, such as by conducting an electrical current via a first contact power signal 75a from the power sending circuitry 48 connecting to a second contact power signal 75b to the power receiving circuitry 60 via the first and second portions 72 and 74. Such contact based charging can be in addition to, or alternative to, induction based power transfer via the primary coil 52 and the secondary coil 54.

Figure 6:
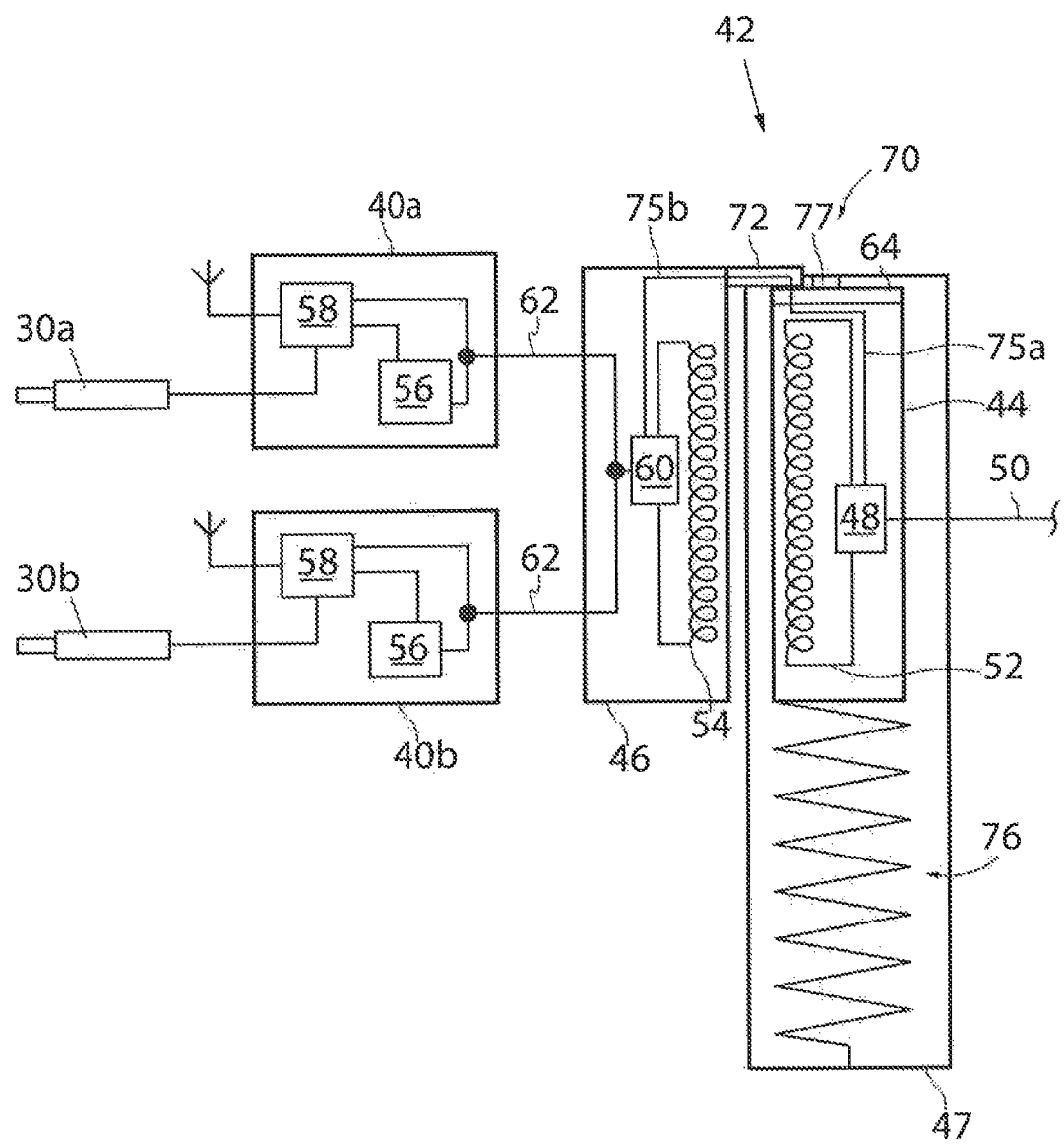
FIG. 6 is a schematic view of the charging system of FIG. 6 in which the loading area is still in the first position, but slightly raised, and the charging system is still transferring charge.

Either the power receiving system 46 or the power sending system 44 can be attached to a support mechanism via one or more springs. Such a spring can be operable to maintain positioning of the power receiving system 46 and/or the power sending system 44 through a limited range with respect to the support mechanism when in the first position. For example, a spring 76 can be connected to the power sending system 44 to maintain the power sending system 44 in the first position (with the power receiving system 46) through a limited range with respect to the second support mechanism. Accordingly, the first position can be maintained until overcoming a tension of the spring 76 and/or reaching a stop 77. As such, the spring 76 can operate from a compressed condition, as illustrated in FIG. 5, to an extended condition, as illustrated in FIG. 6. For example, when lifting the loading area 22, the lock 70 can lift the power sending system 44, extending the spring 76, until a tension of the spring 76 is overcome and/or the power sending system 44 reaches the stop 77. Then, the lock 70 can disable, and the power receiving system 46 can continue to travel upwards with the loading area 22, away from the power sending system 44. In a subsequent lock operation, such as when the loading area 22 is lowered and the power receiving system 46 is again in proximity to the power sending system 44, the lock 70 can enable again and overcome the force of the spring 76 to drag the power sending system 44 along with the power receiving system 46 while charging.

Accordingly, in one aspect, upon reaching the extended condition, the spring 76 can cause a tension sufficient to overcome the lock 70. As a result, the spring 76 can cause the power sending system 44 to pull away from the power receiving system 46 (disabling the lock 70) and into the second position, as illustrated in FIG. 7. Upon disabling of the lock 70, in the second position, the power sending system 44 can become distal to the power receiving system 46, thereby disrupting charging of the power receiving system 46. In addition, the spring 76 can cause the power sending system 44 to return to an equilibrium position for a subsequent lock operation between the power sending system 44 and the power receiving system 46 when moving again into proximity. Also, in another aspect, the stop 77 can prevent the power sending system 44 from further travel, thereby overcoming the lock 70 and causing the power sending system 44 to return to the equilibrium position via the spring 76 for a subsequent lock operation.

The present invention has been shown with the spring 76 connected to the power sending system 44. It should be appreciated, however, that a spring may in addition, or alternatively, be connected to the power receiving system 46. Accordingly, other alternative configurations can be employed as desired without departing from the scope of the invention as set forth above. In addition, while the present invention has been shown and described with respect to the power receiving system 46 being employed to power an electrical device remotely from the power sending system 44, it is understood that the present invention contemplates providing power to any type of powered component or device carried by or secured to a movable component of a vehicle and is not limited to electrical devices.

Figure 8:
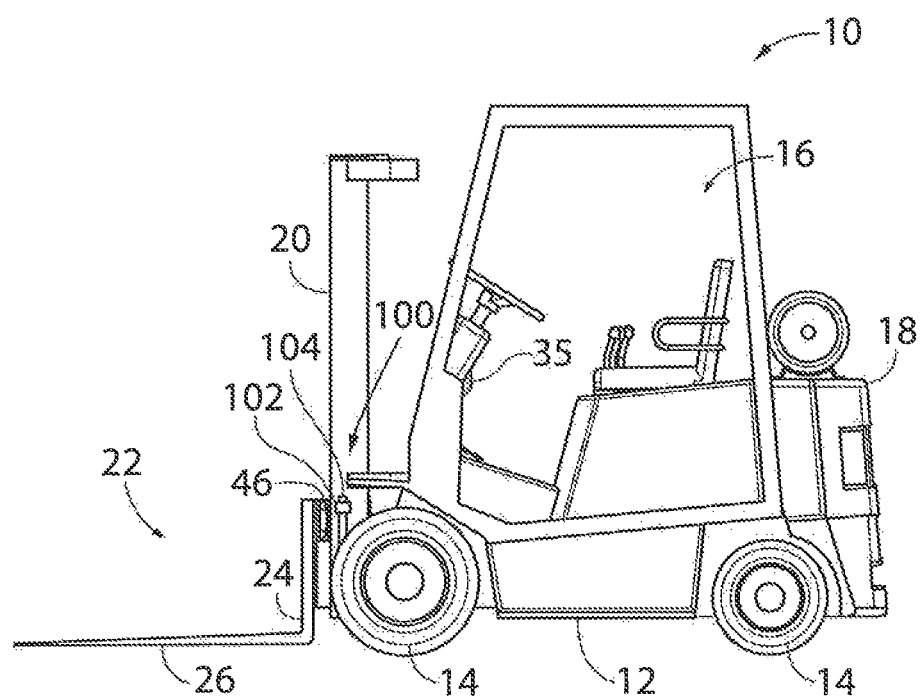
FIG. 8 is a side elevation view of a vehicle incorporating a charging system in accordance with another aspect of the invention, in which the power storage unit is configured to receive electrical power from the power unit when a connector is in contact with a powered rail in the first position.

Referring now to FIG. 8, where like reference numerals refer to like parts where possible, a side elevation view of the vehicle 10 incorporating a charging system in accordance with another aspect of the invention is provided. In particular, the battery system 40 is configured to receive electrical power from a when a connector 102 of the battery system 40 is in contact with a powered rail 104 in the first position as shown. The battery system 40 and the connector 102 can be attached to the loading area 22, while the powered rail 104 is attached to the one of the masts 20, as shown. Accordingly, the connector 102 can move along the powered rail 104 with electrical contact through a length of the powered rail 104 in the first position. Accordingly, direct contact charging of the power battery system 40 can be achieved in the first position.

Representatively, by way of example, the connector 102 can be configured to move with direct contact to the powered rail 104 through a distance, which may preferably be less than about 20% of the travel distance of the loading area 22 with respect to the masts 20. In one aspect, the powered rail 104 could be a rigid conductor having a length of about 1 meter disposed in a direction of motion between loading area 22 and the masts 20.

Figure 9:
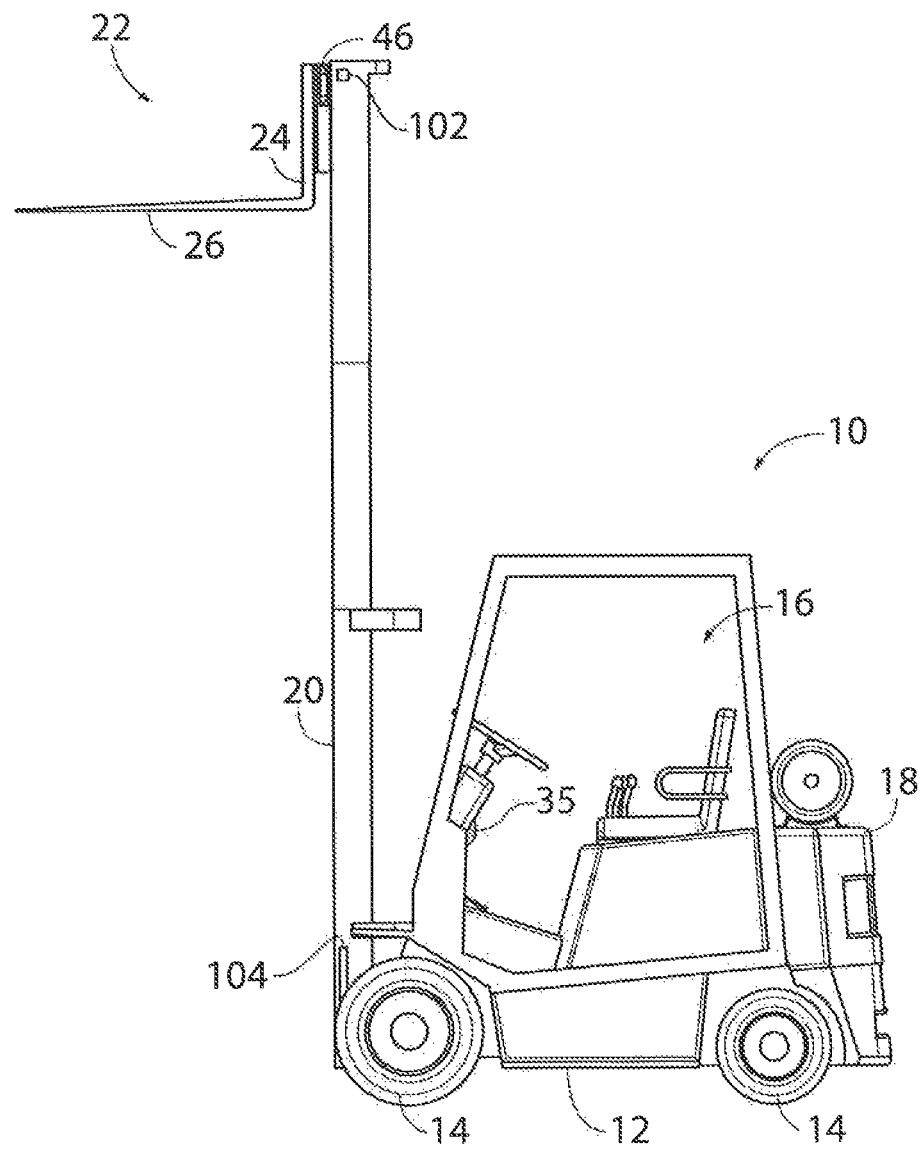
FIG. 9 is a side elevation view of the vehicle of FIG. 8, in which the connector and the powered rail are spaced apart from or distal to one another and therefore no longer charging, and showing operation of the electronic device, such as a lighting arrangement, to illuminate a work area of the vehicle.

With additional reference to FIG. 9, when the connector 102 is spaced apart from the powered rail 104 in the second position as shown, the battery system 40 no longer receives electrical power from the power sending system 44. Nevertheless, the electric actuators 30a, 30b can continue to operate using charge held by the battery system 40.

Figure 10:
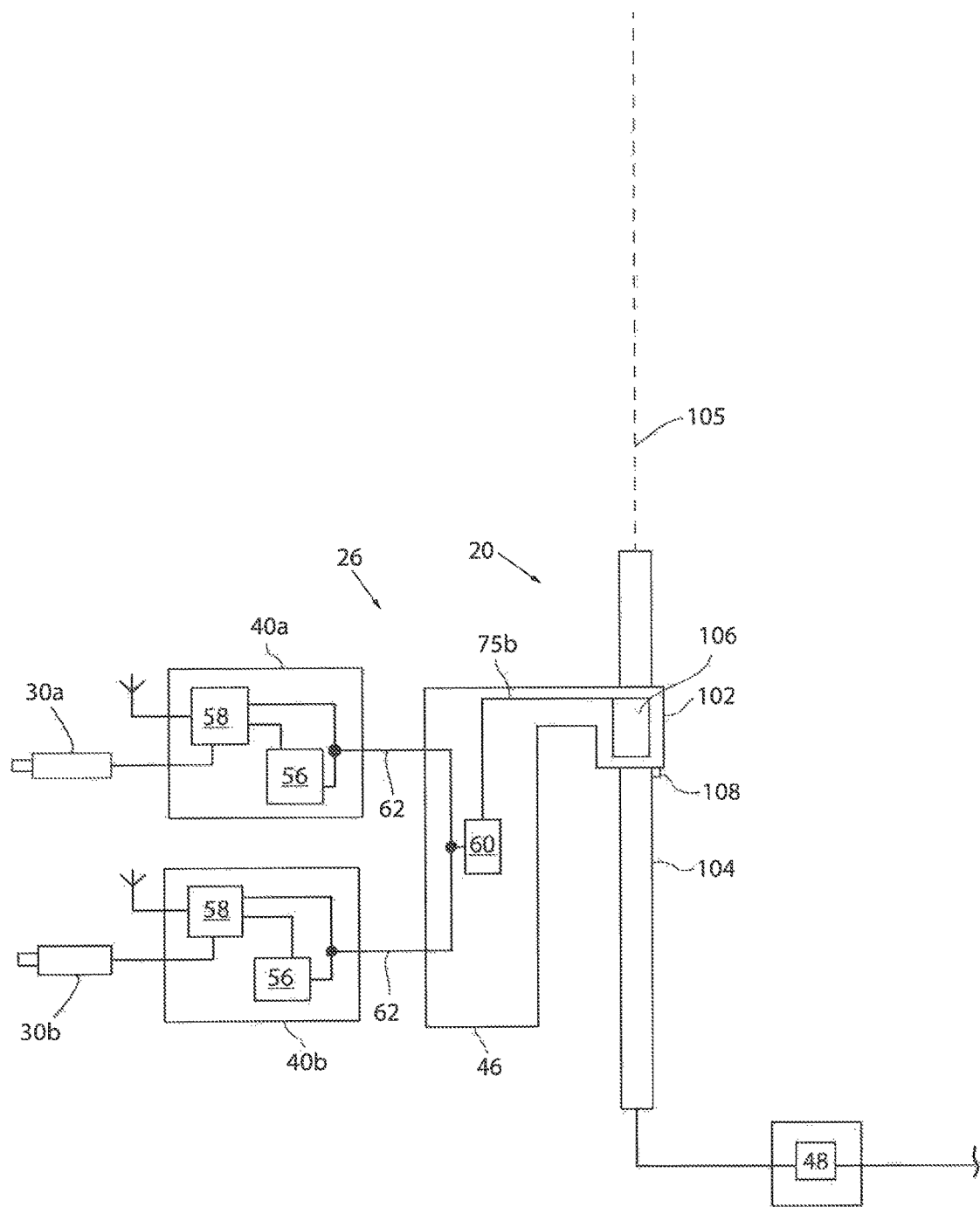
FIG. 10 is a schematic view of the charging system of FIG. 8, in which the connector and the powered rail are in contact with another, and the power unit is charging the power storage unit, in the first position.

Referring now to FIG. 10, a schematic view of the charging system of FIG. 8 is provided. Shown in the first position, the connector 102 and the powered rail 104 are in direct electrical contact with one another. As a result, the battery system 40 receives electrical power from the power sending system 44 in a charging state. In one aspect, the power sending system 44 can provide Direct Current (DC) electrical power to the powered rail 104, which, in turn, can be received by the battery system 40 for electrical charging.

The connector 102 can move along an axis 105, in a direction of motion between the loading area 22 and the masts 20. While in the first position, direct contact charging can be provided at an interface between the powered rail 104 and an electrically conductive surface 106 of the connector 102. Such direct contact charging can be maintained while traveling through the length of the powered rail 104 with the electrically conductive surface 106 sliding along the powered rail 104. The connector 102 can be further configured to move with direct contact to the powered rail 104 using one or more guide wheels 108. The electrically conductive surface 106 can maximize transfer and conduction of electrical power from the powered rail 104 to battery system 40 when in direct contact with the powered rail 104 by providing a large, substantially flat, conductive surface area for contacting the powered rail 104. The electrically conductive surface 106 can, in turn, connect to the power storage unit circuitry 60, for example, via the second contact power signal 75b. It should be appreciated that wireless inductive charging could also be included in this embodiment for additional charging ability by implementation and alignment of the primary and secondary coils 52 and 54, respectively.

Figure 11:
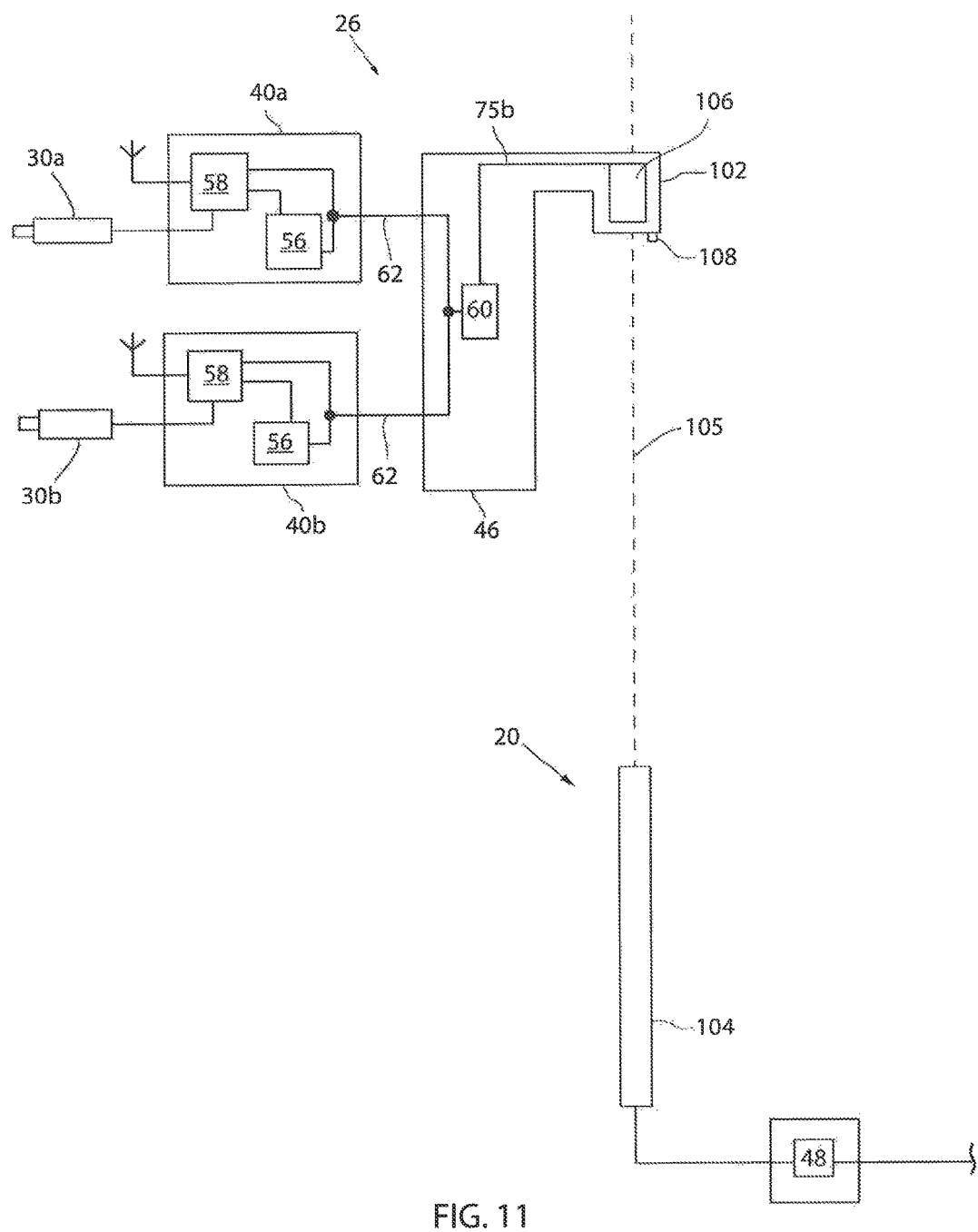
FIG. 11 is a schematic view of the charging system of FIG. 9, in which the connector and the powered rail are spaced apart from or distal to one another, and the power unit is no longer charging the power storage unit, in the second position.
Figure 12:
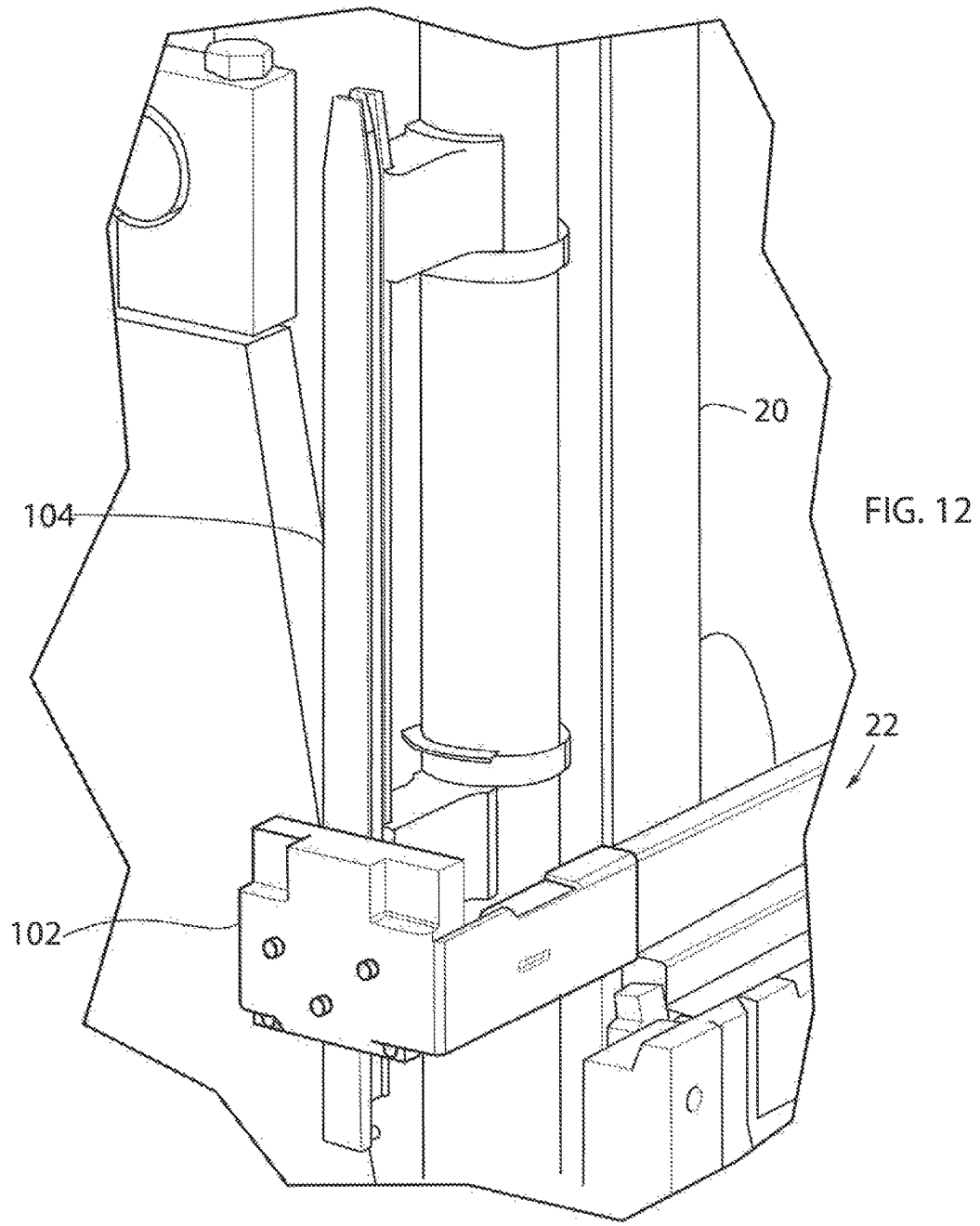
FIG. 12 is a partial isometric view illustrating an embodiment of the charging system of FIGS. 8-11.

Referring now to FIG. 11, a schematic view of the charging system of FIG. 9 is provided. Shown in the second position, the connector 102 and the powered rail 104 are no longer in electrical contact with one another. As a result, the battery system 40 no longer receives electrical power from the sending system 44. Instead, the battery system 40 and the connector 102 are moved along the axis 105, away from the powered rail 104, such as to accomplish a work function. Nevertheless, the actuators 30a, 30b can continue to operate using charge held by the battery system 40. It will be appreciated that variations of the invention can include more than two tines, tines in differing configurations, differing integrations between the battery system and the power receiving system, and the like. All such variations are deemed within the scope of the invention. Various additions, modifications and rearrangements are contemplated as being within the scope of the following claims, which particularly point out and distinctly claim the subject matter regarded as the invention, and it is intended that the following claims cover all such additions, modifications and rearrangements.

What is claimed is:
1. A system for use on a work vehicle, comprising:
   a component configured to lower in a first position and raise in a second position;

a linear electric actuator configured to move a portion of the component when in the first position or the second position; and a power source for providing power to the linear electric actuator for moving the portion, wherein the power source provides power while being charged when in the first position and provides power without being charged when in the second position, and further comprising a power sending system, a power receiving system and a lock between the power sending system and the power receiving system, wherein the power sending system and the power receiving system charge the power source, wherein the power sending system is stationary in the first and second positions and the power receiving system moves with the component, and wherein the power sending system and the power receiving system are movable together in the first position when the lock is enabled.

2. The system of claim 1, wherein the linear electric actuator is a first linear electric actuator configured to move a first tine of a loading area, and further comprising a second linear electric actuator configured to move a second tine of a loading area.

3. The system of claim 1, further comprising masts, wherein the component is configured to lower in the first position and raise in the second position with respect to the masts.

4. The system of claim 1, wherein the power sending system is further configured to provide power to the power receiving system by direct wired contact when the lock is enabled.

5. The system of claim 1, further comprising a spring, wherein at least one of the power sending system and the power receiving system is attached to the spring.

6. The system of claim 2, wherein the first and second linear electric actuators are configured to move the first and second tines, respectively, inward or outward with respect to one another.

7. The system of claim 2, wherein the power source is a first power source, and further comprising a second power source for providing power to the second linear electric actuator for moving the portion, wherein the second power source provides power while being charged when in the first position and provides power without being charged when in the second position, and wherein the first and second power sources are mounted to the first and second linear electric actuators, respectively.

8. The system of claim 7, further comprising a wireless communication device, wherein the wireless communication device is operable to control the first and second power sources.

9. The system of claim 1, wherein the component is a loading area and the portion comprises first and second tines of the loading area, and wherein the first and second tines are configured to move individually with respect to one another.

10. The system of claim 1, wherein the component is a loading area and the portion comprises first and second tines of the loading area, and wherein the first and second tines are configured to move in cooperation with one another to achieve symmetrical spacing between the first and second tines.

11. A method for moving tines on a forklift, comprising:
providing power from a power sending system to a power receiving system, the power sending system comprising a primary coil and the power receiving system comprising a secondary coil, wherein the power is provided between the primary and secondary coils via electromagnetic induction, and wherein the power is provided when the power sending system is proximal to the power receiving system in a first position;

charging a battery system from the power receiving system when in the first position; and providing power to first and second linear electric actuators configured to move first and second tines, respectively, from the battery system, and further comprising enabling a lock between the power sending system and the power receiving system so that the power sending system and the power receiving system are movable together in the first position when the lock is enabled.

12. The method claim 11 further comprising moving the first and second tines individually with respect to one another.

13. The method of claim 11, further comprising moving the first and second tines in cooperation with one another to achieve symmetrical spacing between the first and second tines.

14. A work vehicle, comprising:
an operator cab supported by a frame and wheels;
masts supported by the frame;
a loading area supported by the masts, the loading area having first and second tines;
a charging system comprising a power sending system and a power receiving system wherein the power sending system is configured to provide power to the power receiving system when the power sending system is proximal to the power receiving system in a first position in which the loading area is downward with respect to the masts;
first and second linear electric actuators for moving the first and second tines, respectively; and
a battery system configured to provide power to the first and second linear electric actuators, wherein the power receiving system is configured to charge the battery system when in the first position, and
further comprising a lock between the power sending system and the power receiving system, wherein the power sending system and the power receiving system are movable together in the first position when the lock is enabled.

15. The work vehicle of claim 14, further comprising a second position in which the loading area is upward with respect to the masts, wherein the sending system is distal to the power receiving system and the power sending system no longer provides power to the power receiving system.

16. The work vehicle of claim 14, wherein the power sending system is further configured to provide power to the power receiving system by direct wired contact when the lock is enabled.

17. The work vehicle of claim 16, further comprising a spring, wherein at least one of the power sending system and the power receiving system is attached to the spring.

18. A work vehicle, comprising:
a vehicle body;
a work component that is mounted to the vehicle body for movement between a first position adjacent the vehicle body and a second position away from the vehicle body, wherein the work component includes a movable portion, an electrically powered actuator for moving the movable portion of the work component, and an electrical power storage arrangement for powering the electrically powered actuator; and
a charging arrangement associated with the vehicle and with the work component for selectively providing electrical power to the electrical power storage arrangement, wherein the charging arrangement includes a power sending portion carried by the vehicle and a power receiving portion carried by the work component, wherein when the work component is in the first position the power sending portion and the power receiving portion cooperate to supply power to the electrical power storage arrangement, and when the work component is in the second position the power sending portion and the power receiving portion do not supply power to the power storage arrangement and the power storage arrangement supplies power to the electrically powered actuator for moving the movable portion of the work component, and further comprising a lock between the power sending portion and the power receiving portion, wherein the power sending portion and the power receiving portion are movable together in the first position when the lock is enabled.

* * * * *

UNITED STATES PATENT AND TRADEMARK OFFICE
CERTIFICATE OF CORRECTION

PATENT NO. : 10,501,298 B2
APPLICATION NO. : 15/944358
DATED : December 10, 2019
INVENTOR(S) : Christian Wadell It is certified that error appears in the above-identified patent and that said Letters Patent is hereby corrected as shown below:

In the Claims

Claim 14, Column 10, Line 27, after "system" insert -- , --;

Claim 15, Column 10, Line 46, after "wherein the" insert -- power --.

Signed and Sealed this
Twenty-first Day of January, 2020

Andrei Iancu
*Director of the United States Patent and Trademark Office*